(12) United States Patent
Englert et al.

(10) Patent No.: US 7,795,861 B2
(45) Date of Patent: Sep. 14, 2010

(54) METHOD AND APPARATUS FOR CONTROLLING A MOVABLE OBJECT FOR LOCALIZATION WITHIN A POSITIONING AREA

(75) Inventors: Walter Englert, Burgrieden (DE); Tilman Bucher, Munich (DE)

(73) Assignee: Cairos Technologies AG, Karlsbad (DE)

( * ) Notice: Subject to any disclaimer, the term of this patent is extended or adjusted under 35 U.S.C. 154(b) by 476 days.

(21) Appl. No.: 11/742,513

(22) Filed: Apr. 30, 2007

(65) Prior Publication Data

US 2007/0299625 A1 Dec. 27, 2007

Related U.S. Application Data

(60) Provisional application No. 60/746,255, filed on May 2, 2006.

(30) Foreign Application Priority Data

Sep. 25, 2006 (EP) .................................. 06020009

(51) Int. Cl.
*G01B 7/14* (2006.01)
(52) U.S. Cl. ........................ 324/207.17; 324/207.24; 324/207.16
(58) Field of Classification Search .................. None
See application file for complete search history.

(56) References Cited

U.S. PATENT DOCUMENTS

| 6,351,118 | B1 * | 2/2002 | Ackerman et al. | 324/207.17 |
| 6,528,989 | B1 * | 3/2003 | Hansen | 324/207.12 |
| 6,686,881 | B1 | 2/2004 | Lu et al. | |
| 7,292,026 | B2 * | 11/2007 | Lee | 324/207.17 |
| 2003/0163037 | A1 | 8/2003 | Bladen | |
| 2008/0085790 | A1 * | 4/2008 | Englert | 473/470 |
| 2008/0252015 | A1 * | 10/2008 | Eskildsen | 273/371 |

FOREIGN PATENT DOCUMENTS

| DE | 2732543 | 2/1979 |
| WO | WO 0047291 | 8/2000 |

* cited by examiner

*Primary Examiner*—Jay M Patidar
(74) *Attorney, Agent, or Firm*—Michael A. Glenn; Glenn Patent Group

(57) ABSTRACT

At least two coils located at different positions with regard to a positioning area are controlled to indicate a position of an object located within the range of magnetic fields generated by the coils. An embodiment of the invention comprises a generator that uses a multiplexing technique to generate coil enable signals for the at least two coils. The coil enable signals are generated for the at least two coils with any of different polarities and different intensities.

32 Claims, 6 Drawing Sheets

METHOD AND APPARATUS FOR CONTROLLING A MOVABLE OBJECT FOR LOCALIZATION WITHIN A POSITIONING AREA

CROSS-REFERENCE TO RELATED APPLICATIONS

This application claims priority from European Patent Application No. 06020009.4, which was filed on Sep. 25, 2006, and from U.S. Patent Application No. 60/746,255, which was filed on May 2, 2006, which are both incorporated herein by reference in their entirety.

TECHNICAL FIELD

The present invention relates to a concept for determining the position of a movable object by means of magnetic fields as may be employed, for example, in football, or soccer, for making goal decisions by means of ball localization.

BACKGROUND

A number of tasks, such as ball localization in a football, or soccer, match, presuppose knowledge of the position and/or orientation of objects. In football matches, one of the most controversial topics is whether or not in critical situations the ball has crossed the goal line. To this end, it is necessary that the position of the ball at the goal line may be measured with an accuracy of approximately +/−1.5 cm. Also, it is necessary for any influences exerted by persons who are moving close to the ball and/or are covering the ball to be irrelevant.

There are numerous localization methods based, for example, on optical 2D or 3D sensors having an evaluation system, on exploitation of the known radar principle or of a principle of radio localization.

A principle of radio localization is the localization of objects by means of electromagnetic wave propagation. In this context, a receiver is integrated into an object to be localized, or is attached to an object to be localized, the receiver transmitting data to a central transceiver upon request. A position of the object may thereafter be calculated from signal traveling times and/or from differences between at least two signals received at different antennas.

Radio localization of objects may be performed, for example, by means of the so-called RFID technology (RFID=radio frequency identification). For spatial resolution methods, wherein a relatively precise position of an RFID transponder is to be determined in space, battery-powered, i.e. active, RFID transponders are most often used. A disadvantage of radio localization consists in a shadowing and/or a reflection of electromagnetic waves by certain obstacles, for example. As a result, systems based on radio localization will not achieve the accuracy called for making goal decisions in football, or soccer, for example.

As has already been described, current localization methods are based, for example, on optical 2D or 3D sensors comprising an evaluation system, or they are based on the use of battery-powered, i.e. active, RFID transponders. Such localization methods entail high investment and maintenance cost, sensitivity toward environmental conditions and a high effort called for adapting the evaluation algorithms. Systems exploiting radio localization are not suitable for local-area localization, i.e for determining the positions of objects within a small area, since with a small geometric expansion, differences of different signal traveling times can hardly be measured. Thus, the requirements placed upon systems for localizing objects are not met, or are met only to an insufficient degree, by these methods with regard to economic efficiency, robustness, clock time and independence of an object for exactly determining a position, for example, within a range of a few centimeters.

SUMMARY

According to an embodiment, a device for controlling at least two coils located at different positions with regard to a positioning area, for indicating a position of an object located within the range of magnetic fields generated by the coils, may have: a generator for generating coil enable signals for the at least two coils using a multiplexing technique.

According to another embodiment, a movable object for a localization within a positioning area, within which at least two coils which are located at different positions with regard to the positioning area are controlled in accordance with a control sequence, may have: a magnetic field sensor for detecting a magnetic field within which the movable object is located; a transmitter for transmitting at least one measurement value; and a control for controlling the magnetic field sensor or the transmitter, so that magnetic field measurement values may be sent in accordance with the control sequence.

According to another embodiment, a device for determining information about a position of a movable object within a positioning area within which at least two coils are located at different positions, and are controlled in accordance with a control sequence so as to sequentially generate one magnetic field, respectively, may have: a receiver for receiving a sequence of measurement values from the movable object, it being possible to associate measurement values of the sequence of measurement values with a coil of the at least two coils; and an evaluator for evaluating the sequence of measurement values while using information about the coils from which the individual measurement values originate, so as to acquire the information about the position of the movable object.

According to another embodiment, a positioning system may have:

a device for controlling at least two coils located at different positions with regard to a positioning area, for indicating a position of an object located within the range of magnetic fields generated by the coils, which may have: a generator for generating coil enable signals for the at least two coils using a multiplexing technique;

a movable object, the position of which may be determined, which may have: a magnetic field sensor for detecting a magnetic field within which the movable object is located; a radio transmitter for transmitting at least one measurement value; and a control for controlling the magnetic field sensor or the transmitter, so that magnetic field measurement values may be sent in accordance with the control sequence;

a device for determining information about the position of the movable object, which may have: a receiver for receiving a sequence of measurement values from the movable object, each measurement value of the sequence of measurement values being associated with a coil of the at least two coils, and an evaluator for evaluating the sequence of measurement values while using information about the coils from which the individual measurement values originate, so as to acquire the information about the position of the movable object.

According to another embodiment, a goal including two side posts and a crossbar may have: a first coil and a second coil, the coils being mounted at different ones of the two posts, or the crossbar, respectively.

According to another embodiment, a goal including two side posts and a crossbar may have: a first coil, the first coil being wound around an area demarcated by the side posts and the crossbar.

According to another embodiment, a method of controlling at least two coils, located at different positions with regard to a positioning area, for an indication of the position of an object located within the range of magnetic fields generated by the coils, may have the step of: sequentially generating coil enable signals for the at least two coils using a multiplexing technique.

According to another embodiment, a method of localizing a moveable object within a positioning area within which at least two coils are located at different positions with regard to the positioning area and are controlled in accordance with a control sequence, may have the steps of: detecting a magnetic field within which the movable object is located; transmitting at least one measurement value; and controlling a magnetic field sensor or a transmitter, so that magnetic field measurement values may be sent in accordance with the control sequence.

According to another embodiment, a method of determining information about a position of a movable object within a positioning area within which at least two coils are located at different positions which are controlled in accordance with a control sequence, so as to sequentially generate one magnetic field, respectively, may have the steps of: receiving a sequence of measurement values from the movable object, each measurement value of the sequence of measurement values being associated with a coil of the at least two coils; and evaluating the sequence of measurement values while using information about the coils from which the individual measurement values originate so as to acquire the information about the position of the movable object.

According to another embodiment, a positioning method may have the steps of: controlling at least two coils, which are located at different positions with regard to a positioning area, for indicating a position of an object located within the range of magnetic fields generated by the coils by generating coil enable signals for the at least two coils by means of a multiplexing technique; detecting a magnetic field, within which the movable object is located, by means of a movable object; transmitting at least one measurement value by means of the movable object; and controlling a magnetic field sensor or a transmitter, so that magnetic field measurement values may be transmitted, in accordance with the control sequence, by means of the movable object; receiving a sequence of measurement values from the movable object, each measurement value of the sequence of measurement values being associated with a coil of the at least two coils; and evaluating the sequence of measurement values using information about the coils from which the individual measurement values originate so as to acquire the information about the position of the movable object.

According to another embodiment, a computer program may have: a program code for performing the method of controlling at least two coils, located at different positions with regard to a positioning area, for an indication of the position of an object located within the range of magnetic fields generated by the coils, which method may have the step of: sequentially generating coil enable signals for the at least two coils using a multiplexing technique, when the computer program runs on a computer or a microcontroller.

According to another embodiment, a computer program may have: a program code for performing the method of localizing a moveable object within a positioning area within which at least two coils are located at different positions with regard to the positioning area and are controlled in accordance with a control sequence, which method may have the steps of: detecting a magnetic field within which the movable object is located; transmitting at least one measurement value; and controlling a magnetic field sensor or a transmitter, so that magnetic field measurement values may be sent in accordance with the control sequence, when the computer program runs on a computer or a microcontroller.

According to another embodiment, a computer program may have: a program code for performing the method of determining information about a position of a movable object within a positioning area within which at least two coils are located at different positions which are controlled in accordance with a control sequence, so as to sequentially generate one magnetic field, respectively, which method may have the steps of: receiving a sequence of measurement values from the movable object, each measurement value of the sequence of measurement values being associated with a coil of the at least two coils; and evaluating the sequence of measurement values while using information about the coils from which the individual measurement values originate so as to acquire the information about the position of the movable object, when the computer program runs on a computer or a microcontroller.

According to another embodiment, a computer program may have: a program code for performing the positioning method, which positioning method may have the steps of: controlling at least two coils, which are located at different positions with regard to a positioning area, for indicating a position of an object located within the range of magnetic fields generated by the coils by generating coil enable signals for the at least two coils by means of a multiplexing technique; detecting a magnetic field, within which the movable object is located, by means of a movable object; transmitting at least one measurement value by means of the movable object; and controlling a magnetic field sensor or a transmitter, so that magnetic field measurement values may be transmitted, in accordance with the control sequence, by means of the movable object; receiving a sequence of measurement values from the movable object, each measurement value of the sequence of measurement values being associated with a coil of the at least two coils; and evaluating the sequence of measurement values using information about the coils from which the individual measurement values originate so as to acquire the information about the position of the movable object, when the computer program runs on a computer or a microcontroller.

The findings of the present invention consist in that a position, direction and/or movement of a movable object may be determined by measuring a strength and/or orientation of a static magnetic field at the location of the object. A system for determining the position of a movable object in accordance with an embodiment of the present invention essentially includes magnetic field generators mounted in a stationary manner, and a freely moving magnetic field sensor. A magnetic field generator generates a static or an alternating magnetic field. The intensity and direction of the magnetic field is characteristic of a spatial point. This field is measured by the magnetic field sensor, and the measurement may be interpreted as the location and orientation of the sensor relative to the position of the magnetic field generator. To this end, the magnetic field sensor signals are transmitted to a computer which will identify them for example by means of a known calibration with the spatial point. Thus, the relative position of the magnetic field sensor, i.e. of the movable object, may be indirectly measured via the measured intensity and direction of the magnetic field generated by the magnetic field generator. The magnetic field generator is designed such that the measurements of a field may be checked even at a large relative distance.

To this end, in accordance with an embodiment of the present invention, a first step includes measuring, at the location of the movable object, the strength and direction of the earth's magnetic field relative to the movable object by means of a three-dimensional magnetic field sensor. Subsequently, a second step includes generating a static magnetic field by means of a first coil. In accordance with the invention, the strength and direction of the combination of the static magnetic field generated by the first coil and of the earth's magnetic field is now measured at the location of the movable object. The measurement is performed within a period of time within which the magnetic field generated by the first coil is constant and/or static. A third step now includes, for example, reversing the polarity of the current within the first coil, and subsequently measuring again the combination of the static magnetic field generated by the first coil and of the earth's magnetic field at the location of the object. A combination of the measurements of the second and third steps enables to calculate an effect of the earth's magnetic field and thus to determine an intensity and direction of the magnetic field generated by the first coil. This intensity and direction is characteristic of a spatial point within the range of the magnetic field generated by the first coil, i.e. within a positioning area. Therefore, it is possible to associate the position and orientation of the movable object, relative to the coil's position, with the measured values.

The above-described measurements may be performed, in accordance with the invention, for at least two coils located at different positions with regard to the positioning area, so as to be able to determine a position of the movable object located within the range of the static magnetic fields generated by the coils once the measurement data have been conveyed to a central evaluating device from the movable object.

The central evaluating device may determine a current position, a rotation and a speed of the movable object.

The measured values conveyed from the movable object may be associated, in accordance with a first aspect of the present invention, with the position of the movable object in that, within the central evaluating device, an equation system for determining the position of the movable object, into which the measured values are inserted, is solved.

An advantage of this aspect of the present invention is that no calibration of the system for localizing the movable object needs to be conducted in advance, for example.

In a further aspect of the present invention, the position of the movable object is determined in that the field strengths and orientations measured at the location of the movable object are compared, within the central evaluating device, with pre-determined field strengths and field directions within the localization area and/or positioning area. A data set achieving the best correlation and/or match will eventually designate the location of the movable object.

An advantage of this aspect of the present invention is that unforeseen interference effects on the magnetic field generated by the coils in each case may be taken into account by means of pre-calibration. As a result, the position of the movable object may be determined in a very accurate and reliable manner.

A further finding of the present invention consists in that an accuracy of a system for determining the position of a movable object may be increased by combining measurements of magnetic field strengths with measurements of field directions and/or orientations associated in each case.

A number of the coils, used in the system, for generating static magnetic fields determine the number of dimensions in which a position, direction and/or movement of the movable object may be determined. Generally, a higher number of coils allow a more precise determination of the position of the movable object.

Thus, the inventive concept provides the possibility of determining the position of the movable object, of determining an orientation of the movable object, and the possibility of determining a movement of the movable object, on the basis of associating a magnetic field strength with a distance of the movable object from a coil generating the static magnetic field.

Thus, embodiments of the present invention have the advantage that the position of a movable object and/or of a ball may be determined, for example, without interfering in an ongoing ball game.

In addition, the inventive concept for determining the position of a movable object is tolerant toward persons, for example, i.e. any influence exerted by persons moving close to the movable object and/or covering the movable object is irrelevant.

BRIEF DESCRIPTION OF THE DRAWINGS

Embodiments of the present invention will be detailed subsequently referring to the appended drawings, in which.

DETAILED DESCRIPTION

Figure 1:
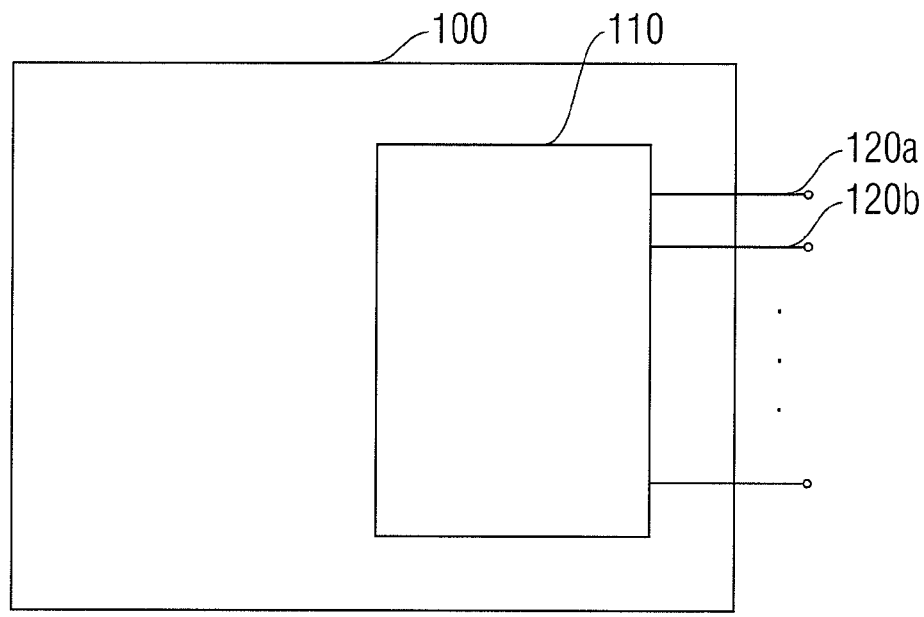
FIG. 1 is a schematic block diagram of a device for controlling at least two coils in accordance with an embodiment of the present invention.

With regard to the following description, one should note that in the various embodiments, functional elements which are identical or have identical actions have identical reference numerals, and that the descriptions of these functional elements are thus interchangeable in the various embodiments represented below.

In the following, the term "signal" will be used for currents or voltages alike, unless explicitly indicated otherwise.

FIG. 1 shows a schematic block diagram of a device 100 for controlling at least two coils, not shown, located at different positions with regard to a positioning area so as to result in an indication of the position of an object, not depicted in FIG. 1, which is located within the range of magnetic fields generated by the coils.

To this end, device 100 comprises means 110 and terminals 120, only two of which are designated by reference numerals 120a and 120b for clarity's sake.

Means 110 serves to generate coil enable signals for at least two coils using a multiplexing technique, the coils being couplable to terminals 120a, b. Generation of the coil enable signals by means 110 may be conducted, in accordance with an embodiment of the present invention, such that only one of the at least two coils is enabled within a first time period $T_1$, and only one other of the at least two coils is enabled within a second time period $T_2$, i.e. in accordance with time division multiplexing. In addition, means 110 is configured, in accordance with an embodiment of the present invention, to generate the coil enable signals at different times in such a manner that a magnetic field generated by a coil which is coupled to terminals 120a, b and is controlled will be constant and/or static for a predetermined time period.

In accordance with a further embodiment of the present invention, the coil enable signals may be generated by means 110 in such a manner that alternating magnetic fields are generated with the at least two coils by means of frequency division multiplexing, so that an alternating magnetic field of one of the at least two coils has a different frequency than an alternating magnetic field of another one of the at least two coils.

In accordance with an embodiment of the present invention, the coil enable signal is a coil current I, for example. In order to be able to generate static magnetic fields of different polarities and/or orientations using the coils coupled to the terminals 120a, b, means 110 is further configured to also generate the coil enable signals and/or the coil currents such that they have different polarities and/or orientations.

So as to be able to vary a range of the magnetic fields generated by the coils coupled to terminals 120a, b, means 110 is further configured, in accordance with an embodiment of the present invention, to generate the coil enable signals with a different intensity, i.e. to generate coil currents of different strengths, for example.

Figure 2A:
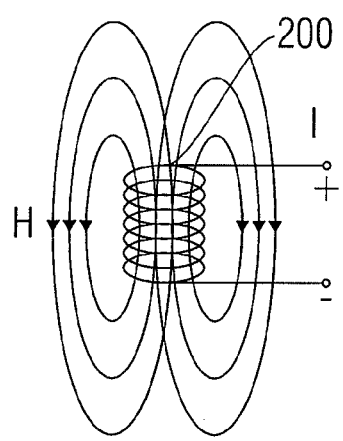
FIG. 2a is a schematic representation of magnetic field lines around a current-carrying cylinder coil for illustrating the inventive concept.

In order to further illustrate the inventive concept for determining the position of a movable object by means of magnetic fields, FIG. 2a depicts a schematic representation of magnetic field lines around a cylindrical coil 200 through which a current I is flowing.

As is known, every charge in motion (electrons in lines or in a vacuum), i.e. a flow of current, has a magnetic field associated therewith. The field quantity associated with the cause of the magnetic field is the magnetic field strength H, independently of the material properties of the space. To generate a static magnetic field, for example short cylinder coils or conductor loops may serve as magnetic antennas. Generally, the magnetic field strength H decreases as its distance from a current-carrying conductor and/or the current-carrying cylinder coil 200 increases. For example, if a measurement point is removed from the center of coil 200 in the direction of the coil axis (x axis), field strength H of the magnetic field will continuously decrease with the distance x. This relationship is depicted by way of example in FIG. 2b.

Figure 2B:
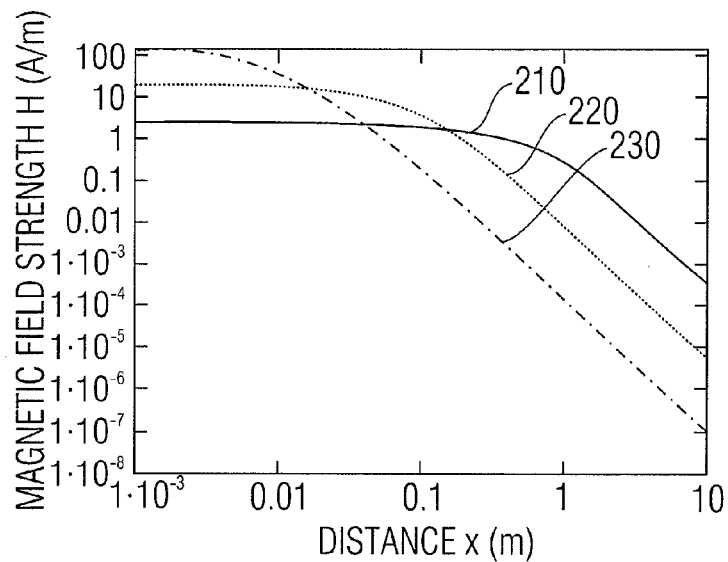
FIG. 2b is a schematic representation of a curve of a magnetic field strength within a near zone around a cylinder coil, plotted over a distance from the cylinder coil.

In a logarithmic representation, FIG. 2b schematically depicts a flow of magnetic field strength H in a near zone of current-carrying cylinder coil 200 with an increasing distance in the x direction, i.e. in the direction of the coil's longitudinal axis. By reference numeral 210, the curve marks, by way of example, a field strength flow at a relatively large radius R of the windings of coil 200. The curve bearing reference numeral 220 correspondingly marks a flow of magnetic field strength H at a medium winding radius R. Accordingly, the curve bearing reference numeral 230 signifies a schematic field strength flow at a small winding radius R of coil 200.

In an open space, the drop in the field strength in the so-called near field of the coil initially amounts to approximately 60 dB per decade, whereupon it will flatten out, in the far field, to 20 dB per decade with the formation of an electromagnetic wave. On closer examination, one will find that field strength H has a nearly constant flow, depending on the radius (or surface area) of coil 200, up to a certain distance x, but will flatten out thereafter. The magnetic field strength curves depicted in FIG. 2b refer to a near zone of cylinder coil 200, i.e. an area of a few meters around cylinder coil 200. Thus, it is possible to associate a distance x from cylinder coil 200 with each magnetic field strength H. As is known, for a field strength flow along the coil's longitudinal axis x of a round coil carrying a current I, the following relationship will result, for example:

$$H = \frac{I \cdot N \cdot R^2}{2 \cdot \sqrt{(R^2 + x^2)^3}} \quad (1)$$

wherein N signifies the number of coil windings, R signifies the winding radius, and x signifies the distance from the coil center in the x direction. As a boundary condition for the validity of relationship (1), h<<R, i.e. a coil height h must be much smaller than the coil radius, and x<λ/2π (λ=wavelength), a transition into the electromagnetic far field of coil 200 starting at a distance x>2π.

The above equation (1) only serves to illustrate the dependence of the magnetic field strength on the distance from a magnetic antenna, or coil. Likewise, it is possible to establish equations describing a field strength flow around a coil within three-dimensional space. In addition to a magnitude of the magnetic field strength H, there is also an alignment, or orientation, of a magnetic field vector $\vec{H}$. If the three components ($H_x$, $H_y$, $H_z$) of the magnetic field vector $\vec{H}$ are measured at the location of the movable object, it will be possible, in accordance with an embodiment of the present invention, to determine, by means of an equation system, the space coordinates (x, y, z) of that location where the magnetic field vector $\vec{H}$ was measured. To be able to exclude ambiguities, one will generally call for measurement values of the magnetic field vectors $\vec{H}$ of several coils.

In accordance with a further embodiment of the present invention, it is possible to measure the magnetic field generated by coil 200 in a three-dimensional manner with a desired accuracy within a positioning area around coil 200, and to associate the measured values, or the components, ($H_x$, $H_y$, $H_z$) of field vector $\vec{H}$ for each relevant space point, for example in a so-called lookup table, with the respective space coordinates (x, y, z) of the space points, and to store them. Of course, it is equally feasible for the field strengths and field directions to be calculated, in accordance with a further embodiment of the present invention, within an area of interest around the coil by means of mathematical formulae, and to subsequently associate them with the respective coordinates (x, y, z) within a lookup table. If, subsequently, a field strength and the associated field direction are measured at any location of the positioning area around the coil, the measurement values may thereafter be compared with the values from the lookup table which have previously been measured or calculated and stored. The data set comprising the best hits will eventually indicate the location of the measurement.

If the movable object, or a three-dimensional magnetic field sensor integrated within the movable object, rotates, it will generally not be possible to unambiguously associate the components ($H_x$, $H_y$, $H_z$) of a magnetic field which have been measured by the magnetic field sensor with a space point within the positioning area. In this case, however, in accordance with an embodiment of the present invention, the magnitude of the magnetic field vector measured, $|H|=(H_x^2+H_y^2+H_z^2)^{1/2}$, may provide information about the position of the movable object within the positioning area. When using only one coil, or only one magnetic field, there will be ambiguities regarding the position, since there will be curves and/or surface areas existing around the coils in which the magnitude of the magnetic field vector |H| measured will be same in each case. However, if at least two coils are used which are located at different positions with regard to the positioning area, these ambiguities may be reduced or fully excluded.

In accordance with embodiments of the present invention, this principle is exploited, for example, to be able to determine a position of a movable object by means of magnetic fields. As was already mentioned at the outset, one of the most controversial topics in a football match, for example, is whether or not, in critical situations, the ball has crossed the goal line. To this end, it is necessary that the position of the ball at the goal line can be measured with an accuracy of about +/−1.5 cm. One arrangement which enables to determine the position of a football by means of magnetic fields is schematically depicted in FIG. 3.

Figure 3:
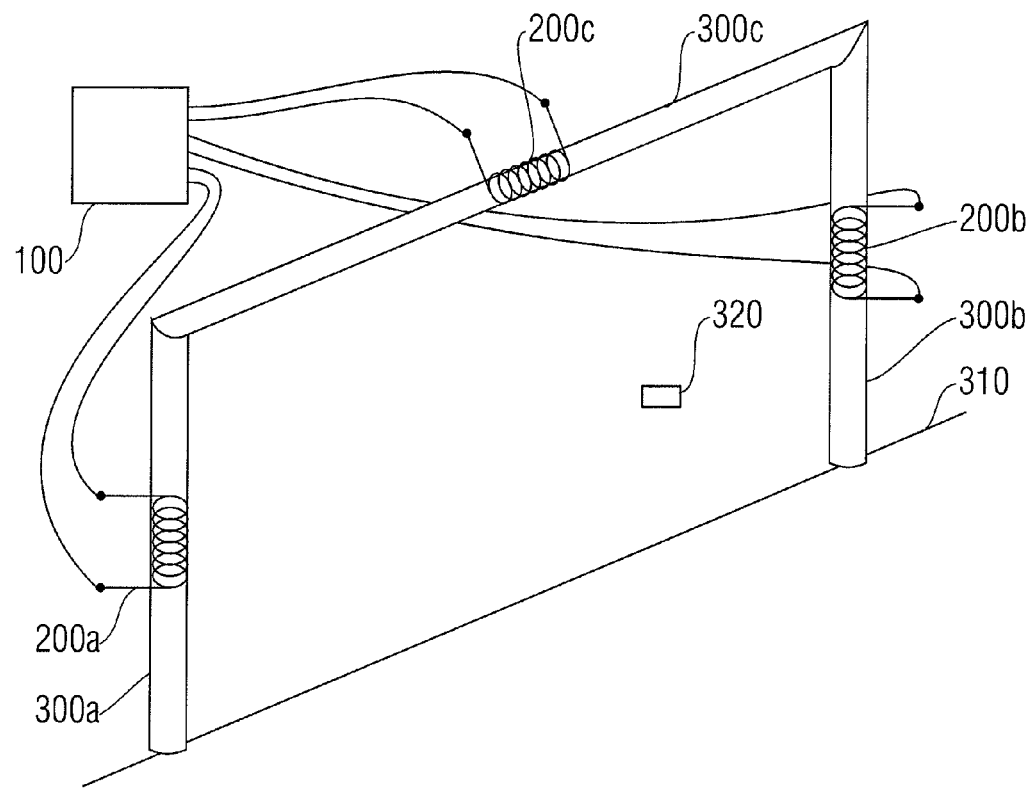
FIG. 3 is a schematic representation of a football goal comprising one coil within a first post, within a second post and within the crossbar, respectively, the coils being coupled to a device for controlling the coils, in accordance with an embodiment of the present invention.

FIG. 3 shows a device 100 for controlling three coils 200a-c located within the two goal posts 300a,b and in a crossbar 300c, respectively, of a football goal 300. The football goal 300 is located on a goal line 310. A movable object 320, the position of which is to be determined, is located within an area in front of football goal 300.

To be able to determine the position of movable object, or ball, 320, it is necessary to measure field strengths of several magnetic fields. In the example shown in FIG. 3 by way of example, different magnetic fields may be generated by means of coils 200a-c and device 100 for controlling the three coils. In accordance with an embodiment of the present invention, the three coils are sequentially controlled by device 100, which means that only one of the three coils 200a-c is active within a first time period $T_1$, a second one of the three coils 200a-c is active within a second time period $T_2$, and the third of the three coils 200a-c is active within a third time period $T_3$. Thus, for example by means of a three-dimensional magnetic field sensor (not shown in FIG. 3) mounted within football 320, the field strengths (magnitudes of the magnetic field vectors) which belong to the coil fields, respectively, and their directions may be measured, at the location of ball 320, and may subsequently be used for being able to determine the position of football 320 by means of an equation system. To be able to correctly determine the position of ball 320, the magnetic fields generated by coils 200a-c should each be static during the measurements. In accordance with an embodiment of the present invention, a superposition of the earth's magnetic field is also taken into account.

The earth's magnetic field is the magnetic field which surrounds the earth. It is generated by the so-called geo dynamo. Above the earth's surface, the field has a shape similar to that of a magnetic dipole. It is essentially on the southern hemisphere that the magnetic field lines exit from the core, and it is through the northern hemisphere that they reenter the core. The earth's magnetic field is static for the most part. In many parts of the earth's surface it is roughly aligned in the geographic north-south direction, which is why a compass needle will point to the north in these regions. At about 20-30 microtesla on the earth's surface, the strength of the earth's magnetic field is relatively small. The earth's magnetic field is not parallel to the earth's surface, but enters into the surface at an angle of inclination.

Figure 4:
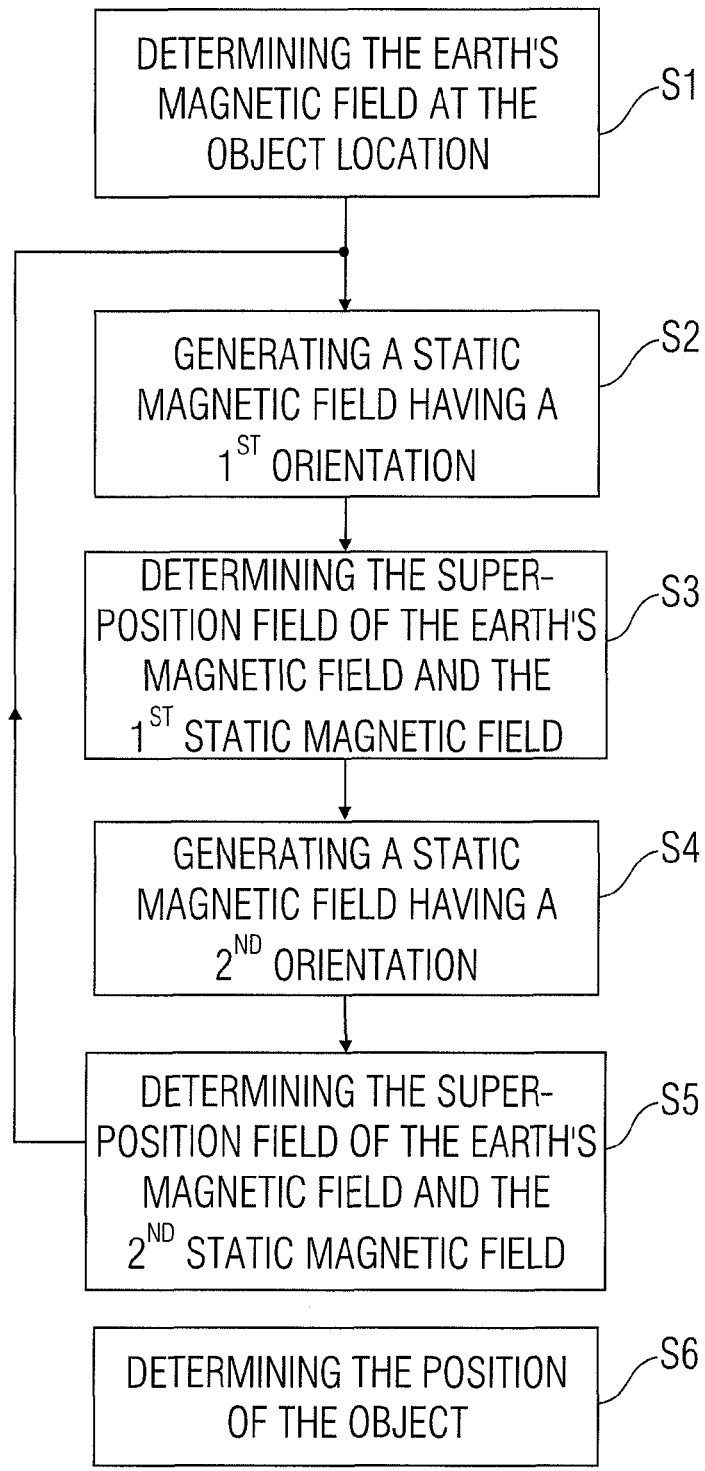
FIG. 4 is a flowchart for illustrating a method of determining a position of a movable object in accordance with an embodiment of the present invention.

A measurement cycle in accordance with an embodiment of the present invention for determining the position of ball 320 is depicted in FIG. 4 by way of example. In this context, FIG. 4 depicts a flowchart of the measurement cycle comprising steps S1 to S6.

In a first step S1 of the measurement cycle, none of the coils 200a-c carries any current. In this step S1, a magnetic field sensor within ball 320 measures the strength and the direction of the earth's magnetic field relative to ball 320. In a second step S2, a current is applied to a first one of the three coils 200a-c, for example coil 200a. The magnetic field sensor within ball 320 now measures, in step S3, the strength and the direction of the combination of the magnetic field generated by coil 200a, and of the earth's magnetic field. The measurement is conducted during that time when the magnetic field of the coil is constant, or static. No measurements are performed while the magnetic field of coil 200a is building up or declining. Once the measurement of step S3 has been terminated, a step S4 includes reversing the polarity of the current within the coil, and repeating the measurement, i.e. in step S5, the magnetic field sensor within ball 320 measures the strength and the direction of the combination of the magnetic field which has been generated by coil 200a and has been reversed, with the earth's magnetic field. A combination of the two measurements of steps S3 and S5 enables to calculate from this an effect of the earth's magnetic field. Following step S5, the measurement cycle for the first coil 200a is completed, and steps S1 to S5 are repeated for the next one of the remaining coils 200b, c, etc. Thus, the earth's magnetic field is measured in between the measurements of the coil fields. Once steps S5 to S5 have been conducted for all coils, the position of ball 320 may be determined, in a step S6, on the basis of the measurements results of steps S1 to S5. This may be accomplished, for example, by solving an equation system or by correlating the measurements results with calibration data stored.

In certain situations in a football match, a football may reach speeds of up to 140 km/h, i.e. about 40 m/s. If a measurement accuracy of about +/−1.5 cm is called for, the entire measurement cycle including all coils 200a-c should be conducted within a time period of about 375 µs. If this time period is divided up among the various coils used, this will result, for example for a three-coils system as is shown in FIG. 3, in about 125 μs per measurement and per coil which are available for measurement. After power-up, current I flowing through a coil will behave, as a function of time t, as is known, in accordance with $$I(t) = I_0 \cdot (1 - e^{t/\tau}), \quad (2)$$

wherein τ signifies a time constant in accordance with τ=L/$R_{Sp}$. In this context, $R_{Sp}$ is, for example, the conductor resistance of the coil, and L is the inductance of the coil. Reversing the current flowing through a coil within a short time may thus be ensured, for example, by a supply voltage of the coil which is selected to be correspondingly high, by a low inductance L, or by a low conductor resistance $R_{Sp}$.

Figure 5:
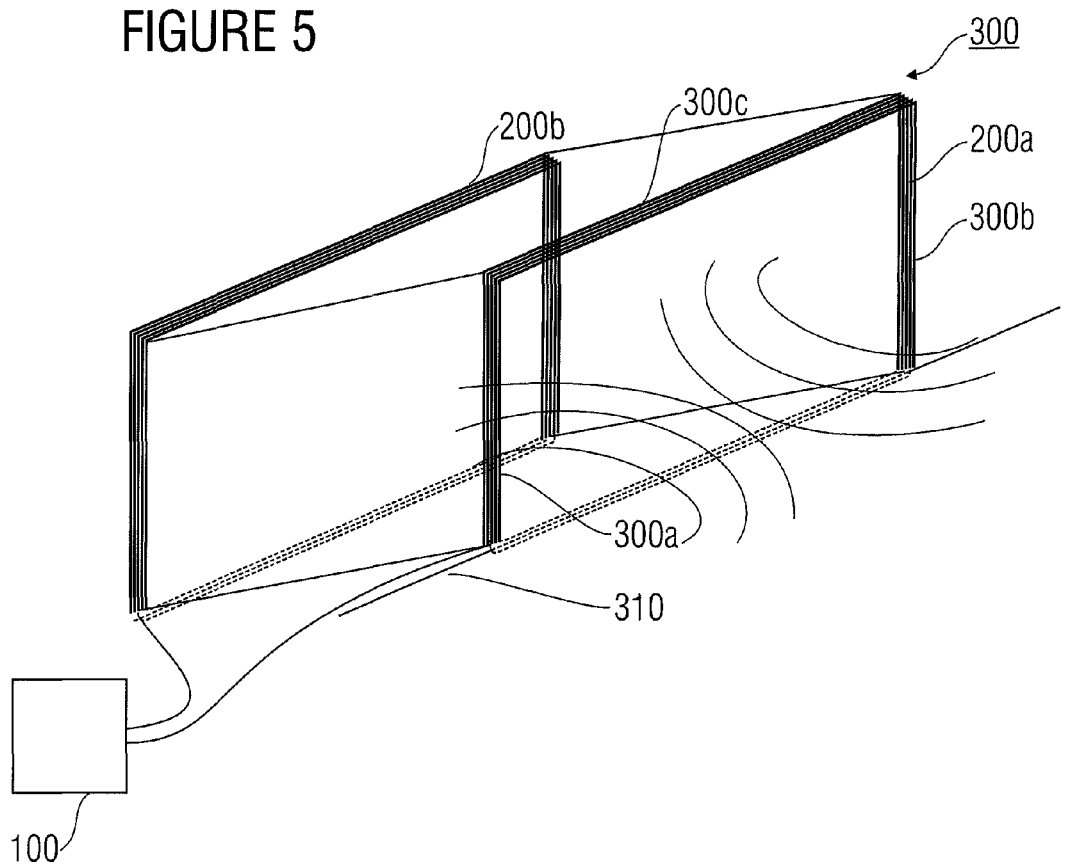
FIG. 5 is a schematic representation of a football goal with a first coil wound around the area demarcated by goal posts and the goal crossbar, and a second coil wound around the area demarcated by net suspensions posts and a net suspension crossbar, the coils being coupled to a device for controlling the coils, in accordance with an embodiment of the present invention.

Since the above presented, with reference to FIG. 3, descriptions of such embodiments of the present invention wherein individual coils are located within goal posts 300a,b and within the crossbar 300c, respectively, of a goal 300, the following will present, with reference to FIG. 5, such embodiments of the present invention wherein the entire goal 300 is part of a coil, or a Helmholtz coil.

To this end, FIG. 5 depicts a football goal 300 comprising a first post 300a, a second post 300b, and a crossbar 300c. In addition, football goal 300 comprises a net suspension having a first post 300d, a second post 300e, and a crossbar 300f. The football goal 300 has its posts 300a, 300b located on a goal line 310. Goal posts 300a,b, crossbar 300c, and goal line 310 form a framework of a rectangular coil 200a which is wound, in accordance with an embodiment of the present invention, within goal posts 300a,b, within crossbar 300c, and, below goal line 310, around the goal opening area. Equally, a coil 200b which is at least approximately identical to coil 200a, is wound within net suspension posts 300d,e, within net suspension crossbar 300f, and below the earth's surface. The two coils 200a,b thus form a pair of coils which is similar to a Helmholtz pair of coils, in accordance with an embodiment of the present invention. In addition, FIG. 5 depicts, in an area in front of football goal 300, a movable object, or ball, 320, the position of which is to be determined. Also, FIG. 5 depicts a device 100 for controlling the two coils 200a,b.

As has already been described with reference to FIG. 1, the two coils 200a,b may be controlled within a multiplexing technique. In accordance with an embodiment of the present invention, this may be time division multiplexing, i.e. controlling of the two coils 200a,b in a temporally sequential manner, as has already been described by means of the flowchart depicted in FIG. 4.

As has already been described above, it is necessary, because of a rotation of ball 320, to measure field strengths, or magnitudes, of several magnetic fields in order to be able to determine the position of ball 320.

Figure 6:
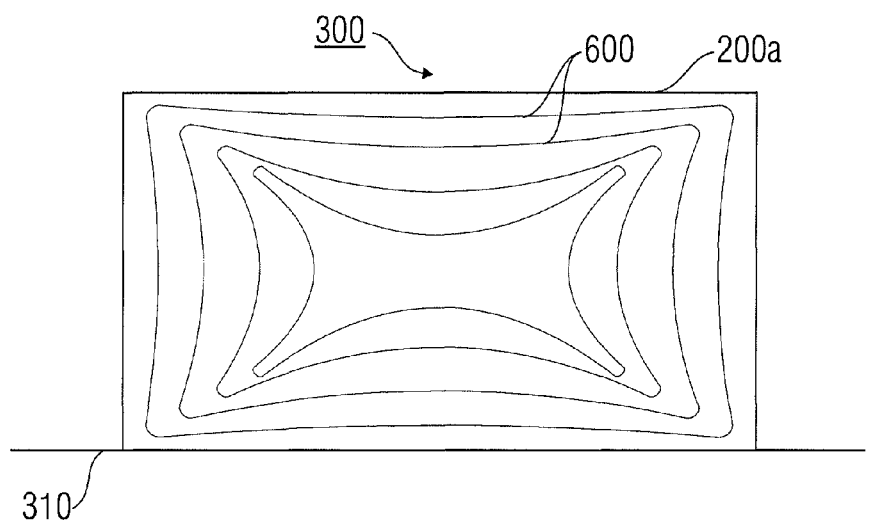
FIG. 6 is a schematic representation of a magnetic field strength distribution within a rectangular coil in accordance with FIG. 5.

The magnetic field of a rectangular coil as is shown in FIG. 5 is generally not homogeneous within the coil, as is illustrated in FIG. 6.

FIG. 6 shows a plan view of the goal, or coil, opening area of coil 200a. The lines indicated by reference numeral 600 schematically designate a field strength distribution within rectangular coil 200a. In this context, a smaller distance of two adjacent lines 600 indicates a comparatively large field strength of the magnetic field at the respective position, whereas a large distance of two lines 600 indicates a comparatively small magnitude of the magnetic field strength within coil 200a. It may be seen from FIG. 6 that particularly in the corner areas of coil 200a, larger magnetic field strengths prevail than in the center of coil 200a. This fact may also be shown analytically, for example, by means of the Biot-Savart law. Generally, a contribution dH of an infinitesimal conductor piece dl, through which a current I is flowing, to the magnetic field H within a point P may be calculated in accordance with $$d\vec{H}(\vec{r}) = \frac{I d\vec{l} \times \vec{r}}{4\pi r^3 25}. \quad (3)$$

In this context, $\vec{r}$ signifies a connection vector from the conductor piece to point P, at which the magnetic field is to be calculated. For any (not necessarily closed) conductor, the magnetic field H is obtained as an integral over the conductor in accordance with $$\vec{H} = \frac{1}{4\pi} \int \frac{I d\vec{l} \times \vec{r}}{r^3}. \quad (4)$$

The inhomogeneous distribution, shown in FIG. 6, of the magnetic field within coil 200a gives rise to ambiguities with regard to the position of ball 320. If only the first coil 200a were used for determining the position of ball 320, it would not be possible to differentiate, for example by means of a magnetic-field magnitude measured, whether the ball which is close to a corner of coil 200a, or of goal 300 is located just in front of or behind the goal, or if it is located, for example, within the center of coil 200a, or of goal 300, at the level of goal line 310. There will be a point near the corner region of coil 200a in front of the goal line, where the magnitude of the magnetic field strength is at least approximately as large as it is at a point in the center of coil 200a at the level of goal line 310, or within that plane spanned by goal line 310 and football goal 300.

To be able to eliminate these very ambiguities, the second coil 200b behind football goal 300 within the net suspension is advantageous. By separately measuring the magnetic field, which has been generated by second coil 200b within a second time period, at the location of the ball, or of the movable object 320, sufficient information may be obtained to be able to determine a precise position of ball 320 in combination with the separate measurement of the magnetic field generated by the first coil 200a within a first time period.

The only thing of interest in the embodiment depicted in FIG. 6 is whether the ball is located in front of or behind goal line 310. However, where ball 320 has crossed goal line 310 within goal 300 is not of interest. By utilizing the measurement values of second coil 200b, one may now determine whether ball 320, which is located close to a corner area of coil 200a, is positioned in front of goal line 310, behind goal line 310, or is located, within coil 200a or goal 300, at the level of goal line 310.

Figure 7:
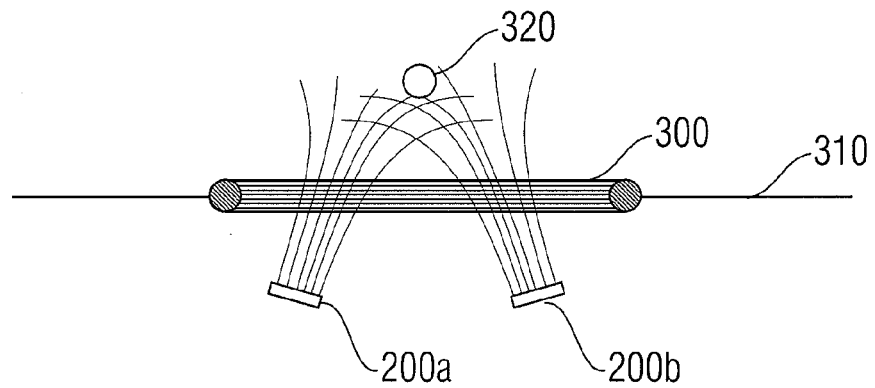
FIG. 7 is a schematic representation of a top view of a football goal behind which two coils are located, in accordance with an embodiment of the present invention.

A further embodiment of the present invention is depicted in FIG. 7.

FIG. 7 shows a plan view of a football goal 300 located on a goal line 310. A first coil 200a and a second coil 200b are located behind goal line 310. The coil axes of the two coils 200a,b at least approximately point in the direction of the pitch.

In addition, it shall be assumed that the two coils are controlled by a device, not shown in FIG. 7, for controlling the two coils, as has already been described previously. The two coils 200a,b may be controlled both in terms of time division multiplexing and in terms of frequency division multiplexing.

In accordance with the invention, a ball 320 located within the positioning area of the two coils 200a,b may measure, by means of a three-dimensional magnetic field sensor, magnetic field vectors of the magnetic field generated by first coil 200a, and of the magnetic field generated by second coil 200b, and transmit them, for example, to a central evaluating device. Even in the embodiment of the present invention which is depicted in FIG. 7, the position may be determined by means of the method described with reference to FIG. 4.

An advantage of the embodiment of the present invention which is depicted in FIG. 7 is that due to the arrangement of the two coils 200a,b, unambiguous decisions may be made as to whether ball 320 is located in front of or behind goal line 310.

In addition to the time division multiplexing technique which has already been described above, the multiplexing technique may also be, in accordance with a further embodiment of the present invention, a frequency division multiplexing technique, i.e. a generation, differing in terms of frequency, of alternating magnetic fields by controlling the two coils 200a,b accordingly. With the frequency division multiplexing technique, it is thus with different frequencies $f_1$ and $f_2$ that coils 200a,b may be controlled by device 100 for controlling the coils.

The mode of operation of the ball, or of the movable object, 320 is to be explained in further detail below with reference to FIG. 8.

Figure 8:
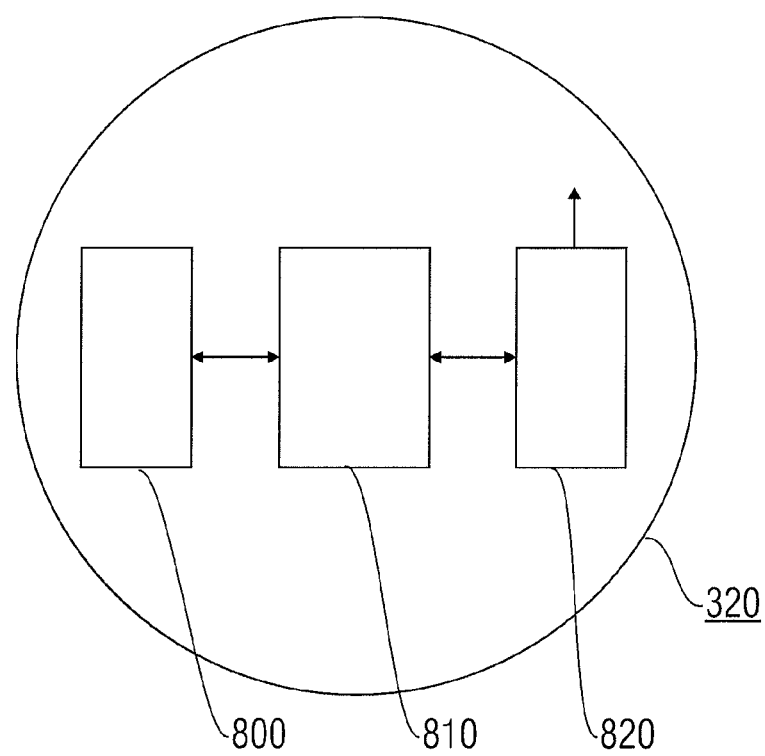
FIG. 8 is a schematic representation of a movable object for localizing the movable object within a positioning area in accordance with an embodiment of the present invention.

FIG. 8 shows a movable object 320 for a localization at a positioning area within which at least two coils (not shown) which are located at different positions with regard to the positioning area are controlled in accordance with a control sequence. The movable object 320 comprises a magnetic field sensor 800 coupled to a control means 810. Also, control means 810 is connected to a transmitter 820.

Magnetic field sensor 800 serves to detect a magnetic field within which the movable object 320 is located. For example, it may be a three-dimensional magnetic field sensor, wherein, for example, a digitalization of the measurement values on a sensor chip has already been integrated. Control means 810 serves to control magnetic field sensor 800 and/or transmitter 820, so that, for example in accordance with the control sequence of FIG. 4, magnetic field measurement values may be sent to a central computer not shown in FIG. 8. Transmitter 820 may allow transmission of at least one measurement value, and may be configured, for example, as a radio transmitter so as not to have to interfere in the ongoing match for evaluating data, for example in a football match.

In accordance with a further embodiment of the present invention, transmitter 820 may also comprise a data interface so as to be able to read out, in an on-wires manner, measurement values which are stored within a memory, not shown in FIG. 8, of movable object 320.

In addition, movable object 320 calls for an energy supply means for energizing the movable object 320. In accordance with an embodiment of the present invention, energy supply may be ensured by a battery. In order to ensure a long life of an energy supply to ball 320, it is also possible, in accordance with an embodiment of the present invention, to be in a position of enabling and disabling same. This should be conducted with a view to requiring as few interventions in the ongoing match as possible.

If transmitter 820 is configured as a radio transmitter, the measurement values may be transmitted, via radio, from the movable object, or ball, 320, for example to a central computer, or a device for determining information about the position of movable object 320, where the current position, a rotation and a speed of ball 320 may be calculated on the basis of the magnetic field measurement values transmitted. In this context, FIG. 9 depicts a schematic block diagram of a device for determining information about the position of movable object 320 within a positioning area within which at least two coils are located at different positions and are controlled in accordance with a control sequence so as to generate one magnetic field, respectively, using a multiplexing technique.

Figure 9:
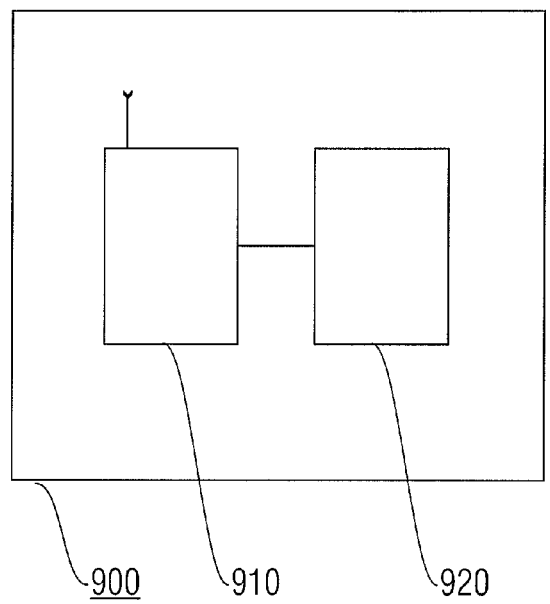
FIG. 9 is a schematic block diagram of a device for establishing information about a position of a movable object within a positioning area in accordance with an embodiment of the present invention.

FIG. 9 shows a device 900 for determining information about the position of the movable object, or ball, 320, device 900 comprising a receiver 910 coupled to an evaluating means 920.

In accordance with an embodiment of the present invention, receiver 910 may be a radio receiver, for example. It shall be noted that receiver 910 might also comprise an interface so as to be coupled, for example in an on-wires manner, to movable object 320 so as to be able to read out the measurement values of the magnetic fields.

If the frequency division multiplexing technique which has already been described previously is employed, device 900 for determining information about the position of the movable object, or ball, 320 will comprise, in accordance with an embodiment of the present invention, a filtering means, in particular a bandpass filtering means, so as to be able to associate the magnetic field measurement values transmitted from ball 320 with the at least two coils 200a,b, respectively. If a bandpass filter has a passband around frequency $f_1$ of the alternating magnetic field of first coil 200a, it is possible to thereby filter out those magnetic field measurement values which may be associated with first coil 200a. Accordingly, with a bandpass filter having a passband around frequency $f_2$ of the alternating magnetic field of second coil 200b, it is possible to filter out those magnetic field measurement values which may be associated with coil 200b. If device 900 for determining information about the position of the movable object, or ball, 320 additionally also comprises a low-pass filter, it is also possible to filter out, when using the frequency division multiplexing method, the measurement values of the static magnetic field of the earth.

In accordance with an embodiment of the present invention, evaluating means 920 is configured to obtain the information about the position of the movable object 320 by solving an equation system into which the sequence of measurement values of the magnetic fields with regard to the at least two coils is inserted. As has already been described previously, evaluating means 920 may also be configured, in accordance with an embodiment of the present invention, to obtain the information about the position of movable object 320 by comparing the measurement values of the sequence of measurement values of the magnetic fields with pre-determined values which correspond to positions of movable object 320 within the positioning area. To this end, for example, the field strengths and the field directions of the individual coil fields in the goal area may be calculated or measured in advance. The measurement values of ball 320 are then compared with these calculated and/or measured values. The location of ball 320 is eventually indicated by that data set which has the best hits.

An accuracy of the determination of the position may be increased, in accordance with an embodiment of the present invention, by combining the measurements of the magnetic field strengths with the measurements of the associated field directions. Thus, a plausibility check may occur, for example, and ambiguities may be excluded. By measuring field vector $H_{earth}$ of the earth's magnetic field at the location of movable object 320, and by subsequently transmitting the measurement data to evaluating means 920, in accordance with an embodiment of the present invention, the rotational speed of the ball, or of the movable object, 320 may be determined within evaluating means 920, and a ball speed and a flight direction may be determined, also within evaluating means 920, by means of previously determined positional values. This information may enable, together with further known physical properties of ball 320, additional error correction for subsequent measurements and positioning actions.

Once the location of movable object, or of ball, 320 has been calculated by evaluating means 920, a check is performed, for example, to see whether ball 320 has crossed the goal line. To this end, known coordinates of the goal line may be utilized. If device 900 establishes a "goal" event, device 900 may further be configured, in accordance with an embodiment of the present invention, to transmit an adequate signal, for example via radio, to a referee's watch.

Figure 10:
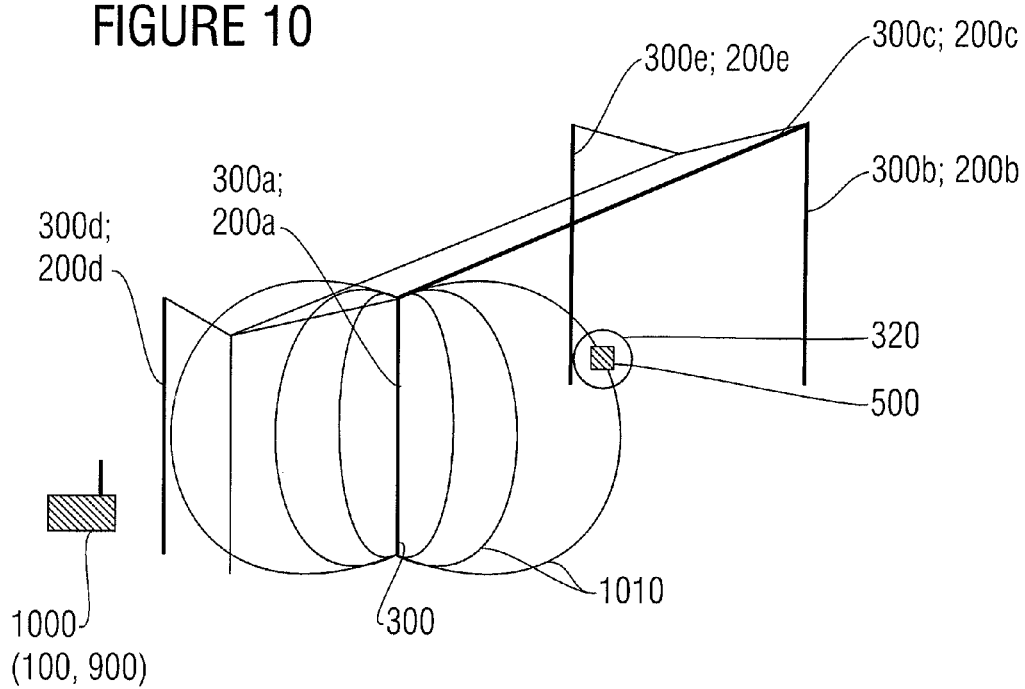
FIG. 10 is a system for determining the position of a football by means of magnetic fields for making goal decisions in a football match, in accordance with an embodiment of the present invention.

In summary, a description is now to be given, with reference to FIG. 10, of a positioning system for determining the position of a movable object or a ball in accordance with an embodiment of the present invention, which comprises embodiments of the inventive system components previously described.

FIG. 10 depicts a football goal 300 comprising a first post 300a, a second post 300b, and a crossbar 300c. In addition, football goal 300 comprises a first net suspension 300d, and a second net suspension 300e. First post 300a comprises a first coil 200a, second post 300b comprises a second coil 200b, crossbar 300c comprises a third coil 200c, first net suspension 300d comprises a fourth coil 200d, and second net suspension 300e comprises a fifth coil 200e. In addition, FIG. 10 depicts a ball 320 which is located within the goal area, or within the positioning area, and comprises a three-dimensional magnetic field sensor 800. In addition, the system shown in FIG. 10 comprises a central control and evaluating device 1000. Reference numeral 1010 designates, by way of example, magnetic field lines emanating from first coil 200a.

The central control and evaluating device 1000 comprises a device 100, described with reference to FIG. 1, for controlling coils 200a-e, as well as a device 900, described with reference to FIG. 9, for determining information about the ball position. The positions of ball 320 are determined, for example, by means of the inventive method described with reference to FIG. 4, a total of five coils 200a-e being employed in the embodiment of the present invention which is depicted in FIG. 7. Of course, the frequency division multiplexing technique previously described could also be employed. Generally, it is to be noted that a utilization of a larger number of coils may increase the accuracy of the determination of the position of ball 320.

In addition, in accordance with an embodiment of the present invention, central control and evaluating device 1000 comprises a means for transmitting information about which coil of the five coils 200a-e is currently being controlled by the means for generating coil enable signals, so as to enable temporal synchronization between the means for generating coil enable signals and the measurement system of ball 320. In this context, the coil information could be transmitted, for example, by means of a radio transmitter. What is also feasible is to code the coil information by means of a specific control sequence of the respective coils. In accordance with an embodiment of the present invention, in addition to the magnetic field measurement data, ball 320 also transmits information about the respective coil to which the magnetic field measurement data correspond to the device for determining information about the ball position.

In accordance with a further embodiment of the present invention, a control sequence for the coils may be predetermined, such that central control and evaluating device 1000 only needs to comprise a means for conveying information about a start of the control sequence of the coil enable signals. Once ball 320 receives this start signal from the means, the magnetic field measurement within the ball is performed by analogy with the control sequence for the coils.

If the frequency division multiplexing technique is employed, central control and evaluating device 1000 will comprise, in accordance with an embodiment of the present invention, a filtering means, in particular a bandpass filtering means, so as to be able to associate the magnetic field measurement values transmitted from ball 320 with coils 200a-e, respectively.

In the inventive localization using magnetic fields, it is advantageous for the field geometry of the respective magnetic fields to be as undisturbed as possible, or to be physically ideal. Potential influences on the field geometry are, for example, ferromagnetic objects in the vicinity of goal 300, induced eddies flowing through moved objects in the vicinity of the goal, or electric systems, such as power cables, in the vicinity of the goal. To eliminate any influence of ferromagnetic objects (e.g. the underlying structure for an extendible lawn in a football stadium), a distortion of the magnetic field in close proximity to the goal line may be measured, for example using a so-called goal scanner, after an installation of the inventive system shown, by way of example, in FIG. 10. Since these influences are static, these measurement values may be taken into account when determining the position of the ball 320. This may be achieved, for example, by means of a correction table within a memory of the central control/evaluating device 1000.

In accordance with an embodiment of the present invention, central control/evaluating device 1000 could comprise a device for determining information about the ball position which is configured to include differential magnetic field measurement values for determining the position, i.e. it is possible to determine not only absolute field strengths of the magnetic fields which may be associated with the individual coils at the location of the movable object, but to determine also differential magnetic fields, or magnetic-field differences between the magnetic fields which may be associated with the individual coils. By looking at magnetic-field differences at the location of the movable object, it is more readily possible to neglect, for example, interfering influences being exerted from the outside.

When conductive objects (also persons) are moving within a magnetic field, a magnetic field can be induced in these objects. This magnetic field could influence the field geometry of the magnetic fields generated by coils 200a-e. In a football match, however, the players do not move fast enough that a perceivable induction could be caused. As was already previously described, ball 320, however, may reach speeds of up to 140 km/m. This is why care should be taken, in one implementation, that the electronic system within ball 320 be as small as possible and comprise no large conductive surface areas.

An influence exerted on the magnetic fields generated by coils 200a-e by power cables located in the vicinity of coils 200a-e is relatively small. A power cable comprises at least one conductor and one return conductor, so that the magnetic fields of the conductor and the return conductor cancel each other out. Even with single conductors, the influence would be relatively small, since with a mains frequency of 50 Hz, the field effect would equal a slight change in the earth's magnetic field. However, in accordance with the invention, this is already taken into account by the measurement method including a polarity reversal of the magnetic fields generated by coils 200a-e.

In accordance with an embodiment of the present invention, ball 320 may be enabled, in the vicinity of goal 300, via a weak signal which is sent, for example, by a transmitter, configured for this purpose, of central control/evaluating device 1000. In accordance with an embodiment of the present invention, ball 320 for this purpose comprises a receiver which receives the enable signal and thereupon enables, via the control means, or a processor, the measurement system within the ball in the vicinity of goal 300. In accordance with an embodiment of the present invention, the processor switches on the receiver within the ball for a short time, for example every 100 ms. As soon as the enable signal is recognized by ball 320, the ball enters into continuous operation.

In accordance with a further embodiment of the present invention, a permanent magnetic field may be generated at goal 300, or in the vicinity of goal 300, via a coil. When ball 320 comes close to goal 300, this is detected by the three-dimensional magnetic field sensor 800 within ball 320. As soon as this event occurs, the measurement system within ball 320 will switch on. Here, too, the sensors may be put into operation for a short time once every 100 milliseconds only.

In both inventive approaches previously described, detection is only ever switched on for a short time so as to save energy. If ball 320 no longer detects any signal over a very long time, for example one day, a timer for detection is adjusted to, for example, ten seconds. In this manner, the energy consumption may be again drastically reduced. Since, in accordance with one embodiment of the present invention, the state of a battery within ball 320 may be queried, it is ensured that the timer within ball 320 is reset to, for example, 100 milliseconds at the start of the match.

In accordance with an embodiment of the present invention, the current supply within ball 320 may be designed for, for example, 300 hours of active playing time. In a so-called "power-down" mode, the lifetime of the battery of ball 320 may be designed for three years, for example. By using a battery, a high-effort charging technology of an accumulator may completely be dispensed with.

It shall be mentioned at this point that the energy supply of ball 320 could of course also be ensured without battery by means of accumulators which may be charged, for example, by natural processes, such as light irradiation or movement. However, this would call for relatively high-effort charging techniques, as was indicated above.

An advantage of the inventive concept for determining positions is that a determination of a position may be conducted in a manner which is very robust toward any wanted or unwanted influence. The system for determining the position of a movable object, depicted in FIG. 10, in accordance with an embodiment of the present invention, could be disturbed, for example, in that a radio link between ball 320 and the central computer 1000 is disturbed. Since, in accordance with an embodiment of the present invention, a receive antenna is integrated within control unit 1000 of the coils and may therefore be located closely behind the goal, interference with the system is very high in effort. In addition, the antenna may be aligned toward the pitch as a directional antenna, for example. In addition, a data transmission between ball 320 and central control unit 1000 is only active, in accordance with an embodiment of the present invention, when the ball is located very close to the goal, i.e. within the positioning area. A receive power of the radio link is very high because of the relatively short distance between ball 320 and control unit 1000. As a result, a potential attacker would have to use a very costly system which thus would be very unlikely to be inconspicuous.

The magnetic fields generated by coils 200*a-e* could also be interfered with. However, artificial magnetic fields do not propagate very far in space, since their field strength decreases proportionally to the square of the distance from the coil. Accordingly, an attacker would have to mount relatively large coils in order to be able to generate a perturbing field.

By means of plausibility considerations integrated into the evaluating means, the system can detect an interference and, for example, generate a warning if somebody were successful at interfering with the system via radio or via a magnetic field.

In accordance with an embodiment of the present invention, magnetic field sensors are fixedly installed at the goal so as to be able to monitor the magnetic fields generated by coils 200*a-e*. The magnetic fields can be regulated by means of these sensors, so that environmental influences (temperature may influence the coil resistance) or technical influences (e.g. sudden switch-on of a lawn heating system) may be corrected.

Since no radio positioning is used in the inventive concept for determining the position of a movable object, other radio systems operating in the same frequency range will not be disturbed. The directional radio link between ball 320 and central computer 1000 may be located, for example, within the range of 2.4 GHz, and is very narrow-band due to the low data rates to be transmitted. Therefore, it does not present any burden on existing WLAN systems (WLAN=wireless local area network).

Since the magnetic fields which are generated by coils 200*a-e* and which are employed are within the order of magnitude of the earth's magnetic field, it may be assumed that they do not have any biological effects. Even the switching of the magnetic fields does not have any appreciable effects due to the sizes of the coils and, therefore, the resulting large area distribution of the magnetic field. In comparison, for example, a load presented at certain points by a mobile telephone is many orders of magnitudes higher.

In systems based on radio positioning, it is mostly not possible, at justifiable effort, to be able to differentiate signal reflections from the original signal if the reflection occurs very close to the transmitter. These problems do not arise with the inventive approach. In addition, there is no problem with regard to a field coverage as with radio positioning or optical systems. Magnetic fields may penetrate persons and goal posts without being damped. However, by means of radio signals the ball can no longer be localized if there are several persons lying on the ball, for example.

A further advantage of embodiments of the present invention is that the movable object, or the ball, may exhibit a low current consumption, since it need not send any continuous localization signal as is called for, for example, with radar systems or radio positioning systems.

If an inventive system is used, for example, for detecting goals in football, no extensive installations in a football stadium will be called for. All necessary installations are only at the two respective goals. In addition, no antennas or cameras need to be calibrated. Also, there is no unnecessary system load caused by balls not participating in the game, since these may be switched off, or are not located within the range of the magnetic fields generated within the goal area.

As was already previously described, no intervention in the ongoing game is called for with the inventive concept, since the ball is enabled automatically.

Last but not least, an installation of an inventive system for determining the position of a movable object may be conducted at considerably lower cost as compared with radio-based or optical systems.

Of course, further possibilities of applying the inventive concept are also found in other types of sports wherein critical goal decisions are to be made. Feasible applications will also be found in logistics, for example, where knowledge of positions of products or goods is often advantageous.

In summary, embodiments of the present invention also provide a method of localizing a ball by means of successive measurements of the field strengths of several coils, a method of positioning a ball by means of successive measurements of the field directions of several coils, a method of increasing the accuracy by combining field strength measurements with field direction measurements, and a method of increasing the accuracy by determining the rotational speed of the ball so as to be able to better calculate the further trajectory. Further embodiments of the present invention include a method of measuring field distortions by means of a goal scanner, a method of positioning by means of pre-calculated field strength and field directions at the level of the goal line. With regard to the ball, embodiments of the present invention provide a method of enabling the ball by means of radio waves, a method of enabling the ball by means of a magnetic field, and a method of saving energy by means of the enabling technology and the dynamic sampling of the enabling conditions. In addition, embodiments of the present invention comprise a method of detecting any wanted or unwanted influences on the system.

It shall be noted, in particular, that the inventive scheme may also be implemented in software, depending on the circumstances. The implementation may be effected on a digital storage medium, in particular a disk or a CD with electronically readable control signals which may cooperate with a programmable computer system and/or microcontroller such that the respective method is performed. Generally, the invention thus also consists in a computer program product comprising a program code, stored on a machine-readable carrier, for performing the inventive method, when the computer program product runs on a computer and/or microcontroller. In other words, the invention may thus be realized as a computer program having a program code for performing the method, when the computer program runs on a computer and/or microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for controlling at least two coils located at different positions with regard to a positioning area, for indicating a position of an object located within the range of magnetic fields generated by the coils, the device comprising:
   a generator for generating coil enable signals for the at least two coils using a multiplexing technique;
   wherein the generator for generating coil enable signals generates the coil enable signals for the at least two coils with different intensities.

2. The device as claimed in claim 1, wherein the generator for generating coil enable signals sequentially generates, using time division multiplexing, coil enable signals for the at least two coils, so that only one of the at least two coils is enabled within a first time period, and only one other of the at least two coils is enabled within a second time period.

3. The device as claimed in claim 2, wherein the generator for generating coil enable signals generates the coil enable signals at different times such that a magnetic field generated by a controlled coil is constant at least for a predetermined time period.

4. The device as claimed in claim 3, wherein the generator for generating coil enable signals generates the coil enable signals at different times such that a magnetic field generated by a controlled coil is constant at least for a time period $T \geqq 10$ microseconds.

5. The device as claimed in claim 2, the device further comprising:
   a conveyor for conveying information about which coil of the at least two coils is currently being controlled by the generator for generating coil enable signals.

6. The device as claimed in claim 2, the device further comprising:
   a conveyor for conveying information about a start of the sequential generation of the coil enable signals.

7. The device as claimed in claim 1, wherein the generator for generating coil enable signals generates alternating magnetic fields using the at least two coils by means of a frequency division multiplexing technique, so that an alternating magnetic field of one of the at least two coils comprises a different frequency than an alternating magnetic field of another of the at least two coils.

8. The device as claimed in claim 1, the device further comprising:
   at least three coils: and
   said generator generating a permanent enable signal for said at least three coils.

9. A movable object for a localization within a positioning area, within which at least two coils which are located at different positions with regard to the positioning area are controlled in accordance with a control sequence, the movable object comprising:
   a generator for generating coil enable signals for the at least two coils using a multiplexing technique;
   wherein the generator for generating coil enable signals generates the coil enable signals for the at least two coils with different intensities;
   a magnetic field sensor for detecting a magnetic field within which the movable object is located;
   a transmitter for transmitting at least one measurement value; and
   a control for controlling the magnetic field sensor or the transmitter, so that magnetic field measurement values may be sent in accordance with the control sequence.

10. The movable object as claimed in claim 9, wherein the magnetic field sensor is a three-dimensional magnetic field sensor.

11. The movable object as claimed in claim 9, wherein the transmitter for transmitting at least one measurement value comprises a radio transmitter.

12. The movable object as claimed in claim 9, the movable object comprising an energy supplier so as to supply the movable object with energy.

13. The movable object as claimed in claim 9, wherein the control controls the magnetic field sensor and/or the transmitter at predetermined time intervals.

14. The movable object as claimed in claim 9, further comprising:
   a receiver for receiving an enable signal for the movable object;
   a processor for enabling the control for controlling the magnetic field sensor or the transmitter on the basis of the enable signal.

15. A device for determining information about a position of a movable object within a positioning area within which at least two coils are located at different positions, and are controlled in accordance with a control sequence so as to sequentially generate one magnetic field, respectively, the device comprising:
- a generator for generating coil enable signals for the at least two coils using a multiplexing technique;
- wherein the generator for generating coil enable signals generates the coil enable signals for the at least two coils with different intensities
- a receiver for receiving a sequence of measurement values from the movable object, it being possible to associate measurement values of the sequence of measurement values with a coil of the at least two coils; and
- an evaluator for evaluating the sequence of measurement values while using information about the coils from which the individual measurement values originate, so as to acquire the information about the position of the movable object.

16. The device as claimed in claim 15, wherein the receiver is a radio receiver.

17. The device as claimed in claim 15, wherein the evaluator acquires the information about the position of the movable object by solving an equation system into which the sequence of measurement values with regard to the magnetic fields of the individual coils is inserted.

18. The device as claimed in claim 15, wherein the evaluator acquires the information about the position of the movable object by comparing the measurement values of the sequence of measurement values with predetermined values which correspond to positions of the movable object within the positioning area.

19. The device as claimed in claim 15, wherein the evaluator increases an accuracy of the information about the position of the movable object in that field strength measurement values of the magnetic field are combined with associated field direction measurement values.

20. The device as claimed in claim 15, wherein the evaluator determines a rotational speed of the movable object by evaluating sequential measurement values of the earth's magnetic field.

21. The device as claimed in claim 15, wherein the evaluator corrects the information about the position of the movable object on the basis of previous information about previous positions of the movable object and the rotational speed.

22. The device as claimed in claim 15, the device further comprising:
- a transmitter for transmitting an enable signal for a movable object.

23. The device as claimed in claim 15, wherein the evaluator for evaluating the sequence of measurement values filters the sequence of measurement values such that a filtered sequence comprises measurement values of magnetic fields of only one of the at least two coils.

24. A positioning system comprising:
- a device for controlling at least two coils located at different positions with regard to a positioning area, for indicating a position of an object located within the range of magnetic fields generated by the coils, the device comprising:
  - a generator for generating coil enable signals for the at least two coils using a multiplexing technique;
  - wherein the generator for generating coil enable signals generates the coil enable signals for the at least two coils with different intensities
- a movable object, the position of which may be determined by said positioning system, said movable object having associated therewith:
  - a magnetic field sensor for detecting a magnetic field within which the movable object is located;
  - a radio transmitter for transmitting at least one measurement value; and
  - a control for controlling the magnetic field sensor or the transmitter, so that magnetic field measurement values may be sent in accordance with the control sequence;
- a device for determining information about the position of the movable object, comprising:
  - a receiver for receiving a sequence of measurement values from the movable object, each measurement value of the sequence of measurement values being associated with a coil of the at least two coils, and
  - an evaluator for evaluating the sequence of measurement values while using information about the coils from which the individual measurement values originate, so as to acquire the information about the position of the movable object.

25. A method of controlling at least two coils, located at different positions with regard to a positioning area, for an indication of the position of an object located within the range of magnetic fields generated by the coils, the method comprising:
- sequentially generating coil enable signals for the at least two coils using a multiplexing technique;
- wherein said coil enable signals are generated for the at least two coils with different intensities.

26. A method of localizing a moveable object within a positioning area within which at least two coils are located at different positions with regard to the positioning area and are controlled in accordance with a control sequence, the method comprising:
- generating coil enable signals for the at least two coils using a multiplexing technique;
- wherein the coil enable signals are generated for the at least two coils with different intensities;
- detecting a magnetic field within which the movable object is located;
- transmitting at least one measurement value; and
- controlling a magnetic field sensor or a transmitter, so that magnetic field measurement values may be sent in accordance with the control sequence.

27. A method of determining information about a position of a movable object within a positioning area within which at least two coils are located at different positions which are controlled in accordance with a control sequence, so as to sequentially generate one magnetic field, respectively, the method comprising:
- generating coil enable signals for the at least two coils using a multiplexing technique;
- wherein the coil enable signals are generated for the at least two coils with different intensities;
- receiving a sequence of measurement values from the movable object, each measurement value of the sequence of measurement values being associated with a coil of the at least two coils; and
- evaluating the sequence of measurement values while using information about the coils from which the individual measurement values originate so as to acquire the information about the position of the movable object.

28. A positioning method comprising:
- controlling at least two coils, which are located at different positions with regard to a positioning area, for indicating a position of an object located within the range of magnetic fields generated by the coils by generating coil enable signals for the at least two coils by means of a multiplexing technique, wherein the coil enable signals are generated for the at least two coils with different intensities;

detecting a magnetic field, within which the movable object is located, by means of a movable object;

transmitting at least one measurement value by means of the movable object; and controlling a magnetic field sensor or a transmitter, so that magnetic field measurement values may be transmitted, in accordance with the control sequence, by means of the movable object;

receiving a sequence of measurement values from the movable object, each measurement value of the sequence of measurement values being associated with a coil of the at least two coils; and evaluating the sequence of measurement values using information about the coils from which the individual measurement values originate so as to acquire the information about the position of the movable object.

29. A computer program embodied within a computer readable medium and having a program code for performing the method of controlling at least two coils, located at different positions with regard to a positioning area, for an indication of the position of an object located within the range of magnetic fields generated by the coils, the method comprising:

sequentially generating coil enable signals for the at least two coils using a multiplexing technique, wherein the coil enable signals are generated for the at least two coils with different intensities, when the computer program runs on a computer or a microcontroller.

30. A computer program embodied within a computer readable medium and having a program code for performing the method of localizing a moveable object within a positioning area within which at least two coils are located at different positions with regard to the positioning area and are controlled in accordance with a control sequence, the method comprising:

generating coil enable signals for the at least two coils using a multiplexing technique;

wherein the coil enable signals are generated for the at least two coils with different intensities;

detecting a magnetic field within which the movable object is located;

transmitting at least one measurement value; and controlling a magnetic field sensor or a transmitter, so that magnetic field measurement values may be sent in accordance with the control sequence, when the computer program runs on a computer or a microcontroller.

31. A computer program embodied within a computer readable medium and having a program code for performing the method of determining information about a position of a movable object within a positioning area within which at least two coils are located at different positions which are controlled in accordance with a control sequence, so as to sequentially generate one magnetic field, respectively, the method comprising:

generating coil enable signals for the at least two coils using a multiplexing technique;

wherein the coil enable signals are generated for the at least two coils with different intensities;

receiving a sequence of measurement values from the movable object, each measurement value of the sequence of measurement values being associated with a coil of the at least two coils; and evaluating the sequence of measurement values while using information about the coils from which the individual measurement values originate so as to acquire the information about the position of the movable object, when the computer program runs on a computer or a microcontroller.

32. A computer program embodied within a computer readable medium and having a program code for performing the positioning method, the positioning method comprising:

controlling at least two coils, which are located at different positions with regard to a positioning area, for indicating a position of an object located within the range of magnetic fields generated by the coils by generating coil enable signals for the at least two coils by means of a multiplexing technique, wherein the coil enable signals are generated for the at least two coils with different intensities;

detecting a magnetic field, within which the movable object is located, by means of a movable object;

transmitting at least one measurement value by means of the movable object; and controlling a magnetic field sensor or a transmitter, so that magnetic field measurement values may be transmitted, in accordance with the control sequence, by means of the movable object;

receiving a sequence of measurement values from the movable object, each measurement value of the sequence of measurement values being associated with a coil of the at least two coils; and evaluating the sequence of measurement values using information about the coils from which the individual measurement values originate so as to acquire the information about the position of the movable object, when the computer program runs on a computer or a microcontroller.

* * * * *